United States Patent [19]

Takezawa et al.

[11] Patent Number: 5,041,855
[45] Date of Patent: Aug. 20, 1991

[54] LENS ASSEMBLY FOR AUTOMATIC FOCUSING CAMERAS

[76] Inventors: Kazumitsu Takezawa; Hideo Kanno; Sachio Ohmori, all of 6-3, Nishi Ohi 1-chome, Shinagawa-Ku, Tokyo, Japan

[21] Appl. No.: 479,208

[22] Filed: Feb. 14, 1990

Related U.S. Application Data

[63] Continuation of Ser. No. 293,597, Jan. 3, 1989, abandoned, which is a continuation of Ser. No. 155,780, Feb. 16, 1988, abandoned.

[30] Foreign Application Priority Data

Feb. 20, 1987 [JP] Japan .................... 62-35830

[51] Int. Cl.$^5$ .............................................. G03B 1/18
[52] U.S. Cl. ............................................. 354/195.1
[58] Field of Search ............................ 354/400–409, 354/195.1; 350/255

[56] References Cited

U.S. PATENT DOCUMENTS

| 4,272,174 | 6/1981 | Terramoto et al. | 354/195.1 |
| 4,413,894 | 11/1983 | Miki et al. | 354/195 |
| 4,553,817 | 11/1985 | Ando et al. | 354/400 |
| 4,893,145 | 1/1990 | Matsuda | 354/400 |

FOREIGN PATENT DOCUMENTS 56-162726 12/1981 Japan ................. 354/195.1

Primary Examiner—L. T. Hix
Assistant Examiner—David M. Gray

[57] ABSTRACT

A lens assembly for an automatic focusing camera having an automatic focusing mode and a manual focusing mode comprises an optical system including a lens group shiftable along an optical axis to perform a focusing operation, a focusing operation member rotatable around the optical axis to shift the lens group along the optical axis to perform the focusing operation, a power drive device for power driving the focusing operation member, a focusing handling member rotatable around the focusing operation member to perform the focusing operation manually, a connection element including a plurality of engaging recesses formed in an outer periphery of the focusing operation member at predetermined intervals in a circumferential direction, and a connecting member shiftable in a radial direction to engage with one of the recesses, the connecting element being adapted to transmit the rotation of the manual focusing handling member to the focusing operation member through the connecting member, and a changing-over device for changing over between a manual focusing mode position where the connecting member is engaged by one of the recesses and an automatic focusing mode position where the connecting member is disengaged from the recess.

14 Claims, 3 Drawing Sheets

LENS ASSEMBLY FOR AUTOMATIC FOCUSING CAMERAS

This is a continuation of application Ser. No. 293,597 filed Jan. 3, 1989, now abandoned, which is a continuation of application Ser. No. 155,780 filed Feb. 16, 1988, both of which are now abandoned.

BACKGROUND OF THE INVENTION

1. Field of the Invention

The present invention relates generally to a lens assembly for automatic focusing cameras, and more particularly, it relates to a lens mount or lensbarrel of a camera in which an automatic focusing mode and a manual focusing mode can be changed over from one mode to the other.

2. Related Background Art

Some of conventional lens assemblies of the above kind have a construction as shown in FIG. 10 wherein a focusing operation is effected as follows: Namely, driving power from a motor in a camera body is transmitted to a power transmission shaft 52 through a plurality of gears and a coupler 52a and then is transmitted, through a gear 52b, to a cam ring 53 rotatable together with a focusing operation ring 54; and the rotation of the cam ring 53 causes a focusing lens group 51 to shift in the direction of an optical axis, thereby performing the focusing operation. Further, in the above conventional lens assembly, since a manual focusing handling ring 56 is so constructed that it is rotated together with the focusing operation ring, in an automatic focusing mode, the focusing operation ring 54 and the manual focusing handling ring 56 are rotated as a unit. Therefore, in the above conventional lens assembly, there is a problem in that, since the manual focusing handling ring 56 is rotated together with the focusing operation ring 54 in the automatic focusing mode, if the manual focusing handling ring 56 is touched or contacted by a finger of a user who holds the lens assembly during the automatic focusing operation, automatic focusing is impeded. In order to solve this problem, the manual focusing handling ring 56 must be so constructed that the handling ring is difficult to be contacted by the finger of the user who holds the lens. However, with such construction, another problem arises in that the manual focusing operability is worsened.

On the other hand, U.S. Pat. No. 4,413,894 discloses a photographic lens assembly having a mechanism for changing over automatic and manual focusing modes, wherein, when the manual focusing mode is desired, a small gear meshed with an external gear (which is formed on the focusing operation ring and which is rotatable around the optical axis to shift the lens along the optical axis) is shifted along the optical axis to be engaged by an internal gear rotatable together with the manual focusing handling ring around the optical axis.

However, in the lens assembly disclosed in U.S. Pat. No. 4,413,894, in order to shift the small gear in the axial direction and to easily engage the small gear with the internal gear, it is necessary to provide a relatively large amount of backlash; consequently, there is a problem in that an accurate focusing cannot be achieved since the rotation of the manual focusing handling ring is not correctly transmitted to the external gear. On the other hand, if the small gear and the internal gear closely mesh with each other to minimize the backlash, another problem arises in that the changing-over operation from the automatic focusing mode to the manual focusing mode cannot be easily and quickly performed since it is difficult to shift the small gear in the axial direction and to engage the small gear with the internal gear.

Furthermore, the above-mentioned U.S. Pat. No. 4,413,894 also discloses an example wherein a clutch mechanism is provided between the focusing operation ring having the external gear meshed with the small gear and the manual focusing handling ring, thereby directly rotating the focusing operation ring by means of the manual focusing handling ring. The clutch mechanism comprises a grooved wheel having a plurality of radial recesses and provided on one end of the focusing operation ring, and a key protruding from a circumferential inner surface of the manual focusing handling ring and capable of engaging with the recesses The key can be inserted into one of the recesses by shifting the manual focusing handling ring along the optical axis. However, even in this case, similar to the above-mentioned case where the focusing modes are changed over by shifting the small gear in the axial direction, if there is no relatively large amount of slack (or play) between the key and the recess, it will be difficult to easily and quickly change over from the automatic focusing mode to the manual focusing mode; whereas, if there is a relatively large amount of slack, it will be difficult to perform the manual focusing accurately and smoothly.

SUMMARY OF THE INVENTION

Accordingly, an object of the present invention is to provide a lens assembly having an excellent operational ability, and further, to provide a lens assembly wherein the focusing modes can be quickly and accurately effected and wherein the manual focusing handling ring is not rotated together with the focusing operation ring in the automatic focusing mode and further wherein even if the manual focusing handling ring is contacted by a finger of the user who holds the lens automatic focusing is not impeded.

Another object of the present invention is to provide a lens assembly wherein the focusing modes can be changed over with a simple construction and wherein the focusing can be easily and smoothly effected in the manual focusing mode.

According to the present invention, in the focusing operation, the focusing lens group is shifted along the optical axis by means of the focusing operation ring rotatable around the optical axis. The focusing operation ring is rotated by power drive in the automatic focusing mode. The manual focusing handling member is rotatably mounted around the focusing operation ring. Between the focusing operation ring and the manual focusing handling member, a connecting means is provided for connecting the ring to the member to transmit the rotation of the manual focusing handling member to the focusing operation ring in the manual focusing mode. The connecting means includes a connecting member which can be elastically shifted in a radial direction by means of a focusing mode changing means. The focusing mode changing means, when set to the manual focusing mode, shifts the connecting member to a first position where the manual focusing handling member is connected to the focusing operation ring; whereas, in the automatic focusing mode, the focusing mode changing means shifts the connecting member to a second position where the manual focusing handling member is separated from the focusing operation ring.

According to the construction of the present invention, when the automatic focusing mode is selected, since the manual focusing handling member or ring is separated from the focusing operation ring, even if the manual focusing handling ring is contacted by a finger of the user, the focusing is not impeded; whereas when the manual focusing mode is selected, since the manual focusing handling ring is rotated in direct sequential operation with the focusing operation ring, there is no substantial play during the rotation of the rings. Further, since the connecting member or changing-over member is made of elastic material, the connecting member can be changed over at any positions, thereby providing a quick changing-over operation. Furthermore, since the connecting member is elastic, even if the manual focusing handling ring is eccentric with respect to the focusing operation ring, the rotation of the manual focusing handling ring ca naturally be transmitted to the focusing operation ring, thereby providing smooth rotation of the rings.

Other objects, features and effects of the present invention will be apparent from the following descriptions in connection with the accompanying drawings.

DESCRIPTION OF THE PREFERRED EMBODIMENTS

The present invention will now be explained in detail in connection with the embodiments thereof illustrated in the accompanying drawings.

Figure 1:
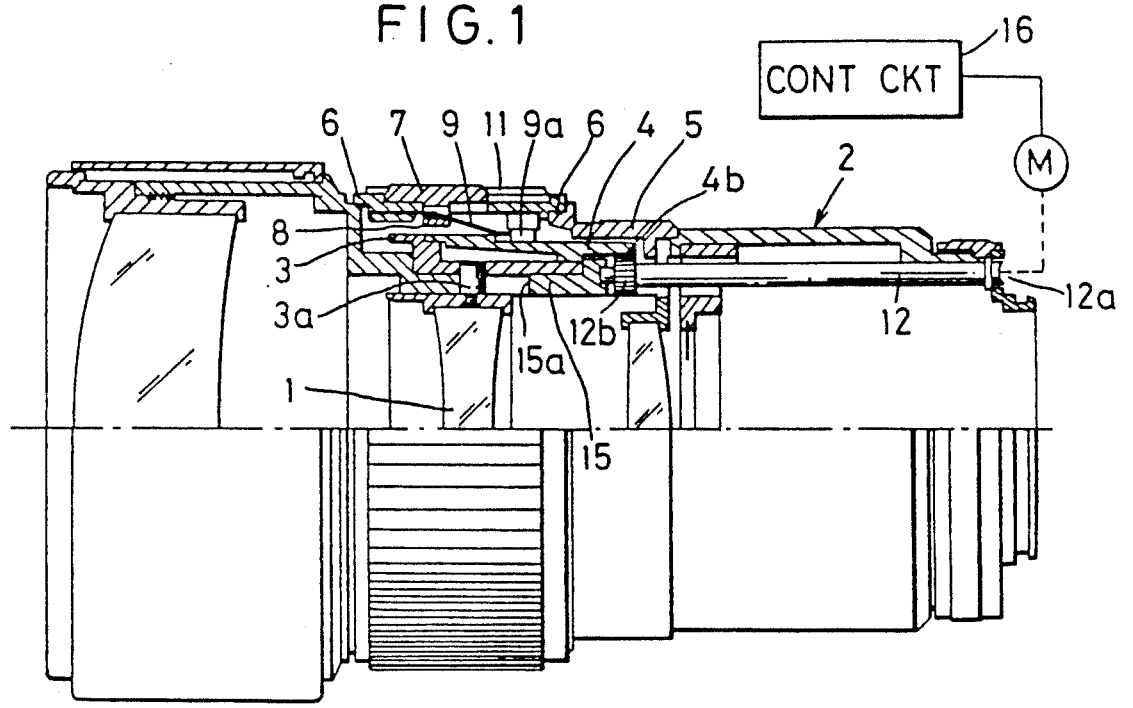
FIG. 1 is a side view of a lens assembly according to a first embodiment of the present invention, wherein an upper half is shown as a sectional view.

FIG. 1 is a partial longitudinal sectional view of a lens assembly according to a first embodiment of the present invention, wherein the lens assembly is in an automatic focusing mode in which the focusing operation can also be effected manually. In FIG. 1, a fixed lens-barrel 2 includes an outer fixed sleeve 5 and an inner fixed sleeve 15. A focusing lens group 1 can be guided along a straight groove 15a formed in the inner sleeve 15 and is shifted in the direction of an optical axis in response to rotation of an annular cam ring 3 having a cam groove 3a, thereby performing focusing. The cam ring 3 is adapted to be rotated together with an annular focusing operation ring 4 rotatable around the optical axis. It should be noted that the cam ring 3 may be formed integrally with the focusing operation ring 4 and the cam groove 3a may be formed in the focusing operation ring.

The focusing operation ring 4 integral with the cam ring 3 is provided at its one end with an internal gear 4b meshed with a small gear 12b. The small gear 12b is fixed to one end of a power transmission shaft 12 which is provided, at its the other end, with a coupler 12a. The coupler can be connected to a rotatable shaft (not shown) driven by a driving motor M under the control of a controlling circuit 16 arranged in a camera body (not shown). With this construction, the focusing operation ring 4 is rotated by the driving power of the driving motor M through the coupler 12a, the power transmission shaft 12 and the small gear 12b.

Figure 2:
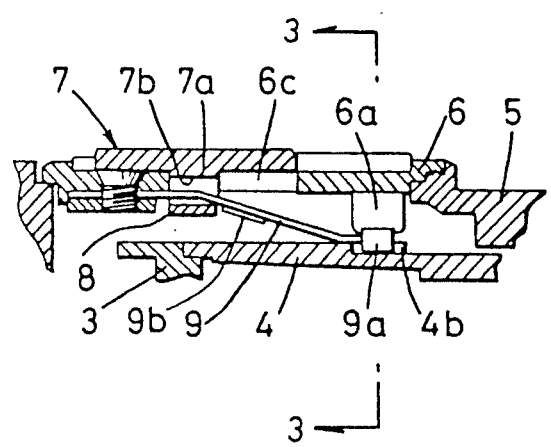
FIG. 2 is an enlarged sectional view of a focusing mode changing mechanism of FIG. 1 in a manual focusing mode.

An annular manual focusing handling ring 6 arranged around an outer circumferential surface of the outer fixed sleeve 5 can rotate around the optical axis. A focusing mode changing member or changing operation member 7 is arranged on the manual focusing handling ring 6, the changing operation member capable of slidably shifting on the handling ring 6 along the optical axis. As shown in FIG. 2, the changing operation member 7 has a projection 7a which protrudes inwardly in a radial direction through an aperture 6c formed in the manual focusing handling ring 6. A projecting plate 8 is integrally fixed to a lower end of the projection 7a.

Further, one end of a connecting member or first leaf spring 9 is fixed, by means of a screw and the like, to an inner surface of the manual focusing handling ring 6 in the proximity of a left edge of the aperture 6c, the first leaf spring being normally biased in the radial direction to be engaged by the focusing operation ring 4.

Figure 3:
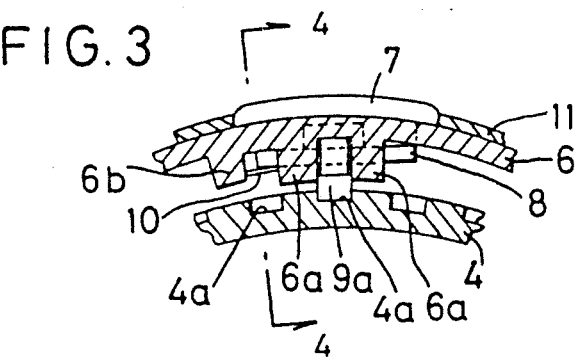
FIG. 3 is a sectional view taken along the line 3-3 of FIG. 2.

As apparent from FIG. 2 showing the manual focusing mode in which a manual focusing operation can be effected, the first leaf spring 9 is provided, at the other end (opposite to the fixed end), with a thickened portion 9a which, in the case, is made of synthetic resin. It should be noted that the thickened portion 9a is not necessarily made of the synthetic resin, but may be formed integral with the first leaf spring 9. However, when the thickened portion 9a is made of the synthetic resin, the thickened portion can easily and smoothly be fitted into one of recesses 4a formed in the focusing operation ring 4, as will be explained later in detail. The first leaf spring 9 has two bent portions near the both ends thereof, these bent portions being bent in opposite directions. Between the bent portions, the first leaf spring has a click step portion 9b which slightly protrudes downwardly. Further, the first leaf spring 9 is inserted into a through opening 7b formed in the projection 7a of the changing operation member 7 so that the leaf spring 9 is biased downwardly (radially inwardly of the assembly) (FIG. 2) at predetermined biasing force. Further, as shown in FIGS. 2 and 3, on an inner surface of the manual focusing handling ring 6, two projections 6a are formed in opposed relation with the recess 4a of the focusing operation ring 4, these projections 6a being protruded from the manual focusing handling ring 6 radially inwardly thereof at a relatively large extent.

The thickened portion 9a of the first leaf spring 9 is held between these projections 6a. During the manual focusing operation, when the rotation of the focusing operation ring 4 is restricted by stops (not shown) at two extreme margins corresponding to infinite object distance and short object distance, since the rotational force of the manual focusing handling ring 6 being manually operated is wholly applied to the first leaf spring 9 to deform the latter (i.e., to twist the first leaf spring 9), it is apparent that the thickened end portion 9a of the first leaf spring 9 might be dislocated from the recess 4a. The pair of the above-mentioned projections 6a serve to minimize such deformation of the first leaf spring 9 thereby preventing the dislocation of the thickened end portion 9a from the recess 4a. As described above, a plurality of the above-mentioned recesses 4a are formed in the outer periphery of the focusing operation ring 4 at predetermined intervals. The thickened end portion 9a of the first leaf spring 9 can be moved, by shifting the changing operation member 7 along the optical axis, between first portion where the thickened end portion 9a is inserted into one of the recesses 4a and a second portion where the end portion 9a does not engage with any recesses. Preferably, an outer peripheral surface of the manual focusing handling ring 6 is coated by a rubber layer 11.

With the construction mentioned above, the lens barrel or lens assembly according to the first embodiment of the present invention operates as follows: At first, when the changing operation member 7 is shifted to the left to select the manual focusing mode,. as shown in Figs. 1 and 2, the thickened end portion 9a of the first leaf spring 9 is shifted downwardly due to the elasticity of the leaf spring itself to lean against or rest on the outer peripheral surface of the focusing operation ring 4. Then, when the focusing operation ring 4 is slightly rotated, the end portion 9a is inserted into one of the recesses 4a. Consequently, the manual focusing handling ring 6 and the focusing operation ring 4 are interconnected by means of the first leaf spring 9 so that these rings rotate in a body. Therefore, by manually rotating the manual focusing handling ring 6, the focusing operation ring 4 is alsorotated accordingly, with the result that the focusing lens group 1 is shifted along the optical axis, thereby effecting focusing.

Figure 5:
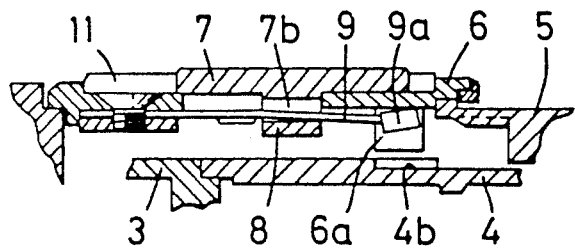
FIG. 5 is an enlarged sectional view of the focusing mode changing mechanism in an automatic focusing mode.

Next, when the changing operation member 7 is shifted to the right to select the automatic focusing mode, the focusing mode changing mechanism is altered to the condition shown in FIG. 5 from the condition of FIG. 2. In this case, the thickened end portion 9a of the first leaf spring 9 is disengaged from the corresponding recess 4a, since the end portion is lifted by the projecting plate 8 of the changing operation member 7. Consequently, the manual focusing handling ring 6 is, separated or disconnected from the focusing operation ring 4 so that these rings cannot rotate as a unit. More particularly, only the focusing operation ring 4 is rotated by means of the motor M to shift the focusing lens group 1 along the optical axis; this means that the focusing operation is effected automatically by the motor drive. In this automatic focusing mode, since the manual focusing handling ring 6 does not contribute to the automatic focusing operation at all, even if the manual focusing handling ring is contacted by a finger of the user, the focusing is not impeded.

When the manual focusing mode is changed-over to the automatic focusing mode, as the click step portion 9b of the first leaf spring 9 slides in the through opening 7b formed in the projection 7a of the changing operation member 7, the user or operator can detect, by the sense of this touch, that the focusing mode has been altered. After the focusing mode has been altered, the click step portion 9b serves as a stop for preventing retrogression.

Figure 4:
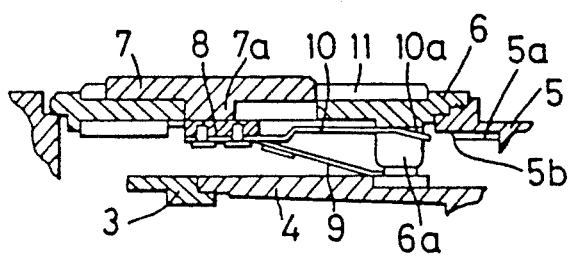
FIG. 4 is a sectional view taken along the line IV—IV of FIG. 3, showing a locking device for preventing the rotation of the manual focusing handling ring.

Further, as can be understood from FIG. 4, a second leaf spring 10 having predetermined elasticity and having a length longer than the first leaf spring in the direction of the optical axis is provided, in parallel with the first leaf spring 9, to restrict the rotation of the manual focusing handling ring 6. One end of the second leaf spring 10 is fixed to the projecting plate 8 of the changing operation member 7. The other end of the second leaf spring 10 terminates to a bent portion 10a bent radially inwardly of the assembly. A plurality of grooves 5a are formed in the inner peripheral surface of the outer fixed sleeve 5 of the fixed lens-barrel 2 at the end portion of the sleeve 5 near the changing operation member 7. These grooves 5a extend in the direction of the optical axis and each adapted to slidably receive the bent portion 10a of the second leaf spring. Each groove 5a includes a slant portion 5b at its one end facing the bent portion 10a. The slant portion 5b is inclined at an angle corresponding to the inclination of the bent portion 10a of the second leaf spring 10. A small projection 6b is formed on the manual focusing handling ring 6 for the same reason as the provision of the projections 6a. The second leaf spring 10 is held between the small projection 6b and one of the projections 6a. The second leaf spring 10 and the grooves 5a constitute a locking device for preventing the rotation of the manual focusing handling ring 6.

Figure 7:
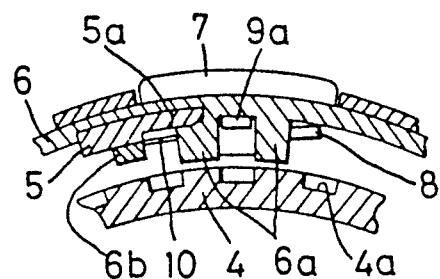
FIG. 7 is a sectional view taken from the line 7—7 of FIG. 6.
Figure 6:
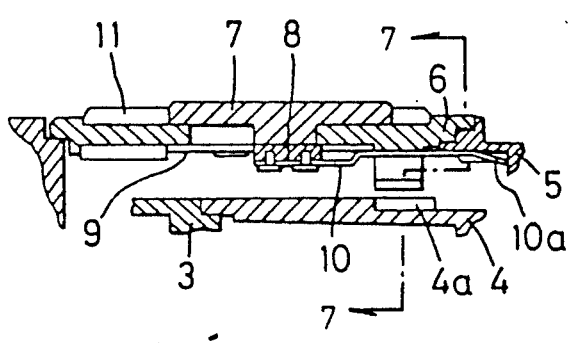
FIG. 6 is an enlarged sectional view of the manual focusing handling ring locked by the locking device of FIG. 4.

When the changing operation member 7 is shifted to the right from the manual focusing mode position shown in FIG. 4 to select the automatic focusing mode, the bent portion 10a of the second leaf spring 10 slides on the slant portion 5b of the outer sleeve 5. Then, when the manual focusing handling ring 6 is slightly rotated, the bent portion 10a of the second leaf spring 10 is fitted into one of the grooves 5a (FIGS. 6 and 7), thereby preventing a further rotation of the manual focusing handling ring 6. On the other hand, in the manual focusing mode, as shown in FIG. 4, the bent portion 10a of the second leaf spring 10 is disengaged from the groove 5a, with the result that the manual focusing handling ring 6 is disconnected from the outer fixed sleeve 5.

With this construction, during the automatic focusing operation, the inadvertent rotation of the manual focusing handling ring 6 is prevented. Thus, in the automatic focusing mode, the whole outer periphery of the lens assembly is constituted by fixed elements, and, therefore, the lens is positively and accurately held in the assembly.

Figure 8:
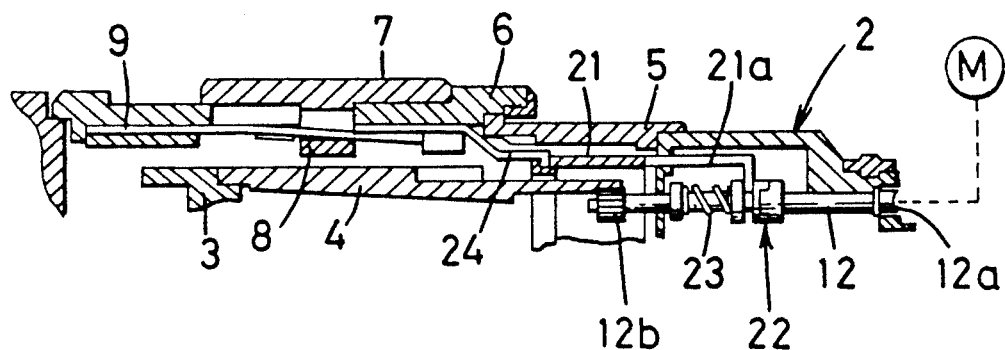
FIG. 8 is an enlarged sectional view showing a focusing mode changing mechanism, in the automatic focusing mode, according to a second embodiment of the present invention wherein a clutch mechanism for a power transmission shaft is added.
Figure 9:
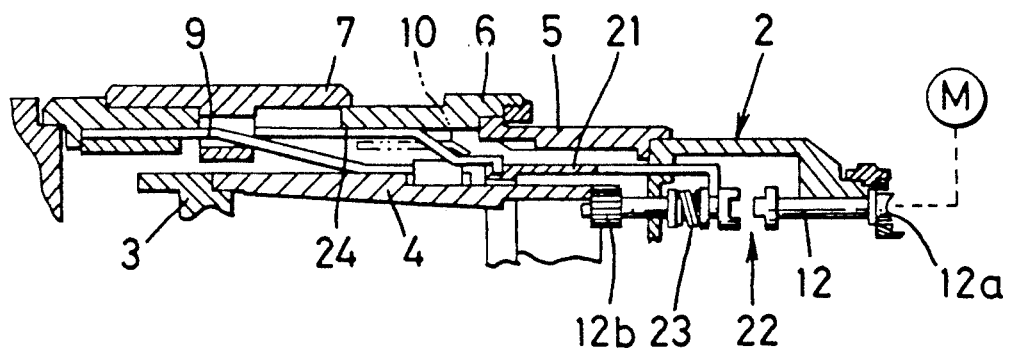
FIG. 9 is a sectional view similar to FIG. 8, but in the manual focusing mode.
Figure 10:
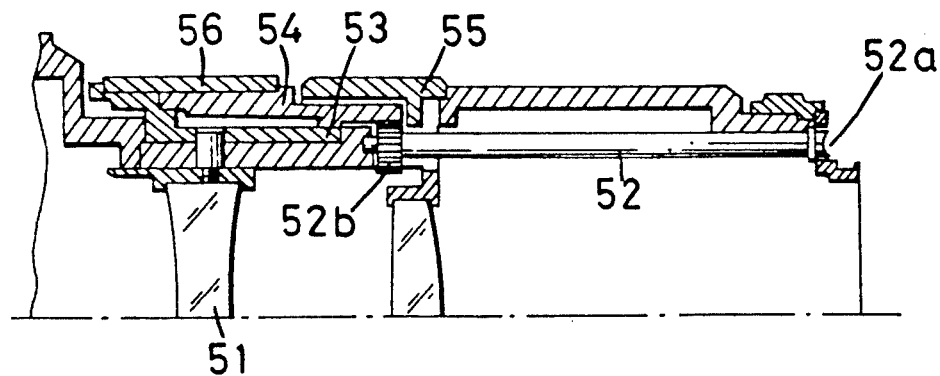
FIG. 10 is a sectional partial view showing an example of a conventional lens assembly having an automatic focusing mechanism in which manual focusing can also be effected.

FIGS. 8 and 9 each shows a schematic sectional view of a focusing mode changing mechanism according to a second embodiment of the present invention. In these Figures, parts or elements having the same construction and/or function as those shown in the FIGS. 1-7 are indicated by the same reference numerals as used for the corresponding elements of FIGS. 1-7, and the detailed explanation as to these elements is omitted here.

In the second embodiment of the present invention, a clutch 22 is arranged on the power transmission shaft 12. The clutch 22 controls the transmission and interruption of the driving power of the motor M in the camera body to the gear 12b. The clutch 22 can operate in response to the movement of the changing operation member 7. FIG. 8 shows the condition wherein the driving power of the motor is transmitted to the focusing operation ring 4 through the shaft 12, the engaged clutch 22 and the gear 12b. The clutch 22 is operatively connected, through a first clutch arm 21a, to a cylindrical clutch cooperating member 21 which can shift along the optical axis. The clutch cooperating member is, in turn, operatively connected to a second clutch arm 24. The second clutch arm 24 is fixedly connected to the projecting plate 8 of the changing operation member 7 in such a manner that the second clutch arm can be shifted in response to the changing movement of the changing operation member 7.

In the position shown in FIG. 8, the clutch 22 is engaged by a spring force of a coil spring 23 to transmit the driving power of the motor M to the gear 12b.

FIG. 9 shows the manual focusing mode position wherein clutch 22 is disengaged by shifting the clutch cooperating member 21 forwardly i.e. to the left in FIG. 9 along the optical axis, against the spring force of the coil spring 23, in response to the sliding movement (to the left) of the changing operation member 7. Thus, in this condition, the driving force of the motor M is not transmitted to the small gear 12b. In this case, an electrical switch may be provided in such a manner that, when the clutch 22 is disengaged by the leftward movement of the clutch cooperating member 21, the electrical switch is actuated in response to the movement of the clutch cooperating member to generate a signal for stopping the motor. With this construction, when the changing operation member 7 is shifted to select the manual focusing mode, the motor M is not only mechanically disconnected from the gear 12b (non-transmitting condition), but also is electrically de-energized; thus, useless or waste driving power of the motor can be avoided. According to the second embodiment of the present invention, in the manual focusing mode, since the focusing operation ring 4 is disconnected from the motor M, the manual focusing operation can quickly and smoothly be performed, regardless of the focusing mode set in the camera body.

Although the motor M is arranged in the camera body in the illustrated embodiments, it should be noted that the present invention is applicable to cameras wherein the motor is arranged in the lens assembly. Further, the recesses 4a of the focusing operation ring 4 may be slightly tapered so as to facilitate the insertion of the thickened end portion 9a of the first leaf spring 9 into the recesses 4a.

We claim:

1. A lens assembly having an optical system including a lens group shiftable along an optical axis to perform a focusing operation, comprising:
   a focusing operation member rotatable around the optical axis to shift said lens group along the optical axis to perform the focusing operation;
   power drive means for power driving said focusing operation member;
   a focusing handling member rotatable around said focusing operation member to perform the focusing operation manually;
   connecting means including a plurality of engaging recesses formed in an outer circumferential periphery of said focusing operation member at predetermined intervals in a circumferential direction, and a connecting member shiftable in a radial direction to engage with one of said recesses, said connecting means being adapted to transmit the rotation of said manual focusing handling member to said focusing operation member through said connecting member; and
   changing over means for changing over between a manual focusing mode position where said connecting member is engaged by one of said recesses and an automatic focusing mode position where said connecting member is disengaged from said recess.

2. A lens assembly as set forth in claim 1, wherein said connecting means further includes a pair of restraining projections formed on a circumferential inner surface of said manual focusing handling member, said restraining projections being adapted to slidably hold said connecting member therebetween to prevent tangential movement of said connecting member.

3. A lens assembly as set forth in claim 1, wherein said connecting member comprises a resilient member having one end fixed to said manual focusing handling member and the other end including an end portion engageable with one of said recesses, and wherein, when said automatic focusing mode position is selected, said changing-over means disengages said end portion of said resilient member from an engaged recess against the spring force of said resilient member.

4. A lens assembly as set forth in claim 1, further comprising locking means for preventing the rotation of said manual focusing handling member, said locking means preventing the rotation of said manual focusing handling member while said changing-over means is in said automatic focusing mode position.

5. A lens assembly as set forth in claim 4, wherein said locking means comprises a spring member shiftable along the optical axis in response to said changing-over means, and prevents, when said changing-over means disengages said connecting member from an engaged recess, the rotation of said manual focusing handling member by shifting said spring member along the optical axis.

6. A lens assembly as set forth in claim 4, wherein said power drive means includes clutch means for interrupting the power transmission to said focusing operation member, and wherein, when said changing-over means is in said manual focusing mode position, said locking means releases said manual focusing handling member and said clutch means interrupts the power transmission to said focusing operation member.

7. A lens assembly as set forth in claim 1, wherein said connecting member comprises a leaf spring member having one end fixed to said manual handling member and the other end biased toward engagement with one of said recesses; said changing-over means comprises a manual changing member slidable on said manual focusing handling member, and a projecting member passing through said manual focusing handling member and projecting from said manual changing member and engaging with said leaf spring member; said projecting member disengages, when said manual changing member is shifted from said manual focusing mode position to said automatic focusing mode position, said connecting member from an engaged recess against the spring force of said leaf spring member.

8. A lens assembly as set forth in claim 7, further comprising locking means including a second leaf spring member having one end fixed to said projecting member and extending in a direction of the optical axis and a plurality of fixed recesses formed in a fixed portion of said lens assembly and engageable with the other end of said second leaf spring member, and further wherein, when said manual changing member is changed to said automatic focusing mode position, said the other end of said second leaf spring member engages one of said fixed recesses to prevent the rotation of said manual focusing handling member.

9. A lens assembly as set forth in claim 6, wherein said changing-over means is supported by said focusing handling member so as to be slidable in a direction parallel to said optical axis relative to said focusing handling member and includes an arm that extends through said focusing handling member and that engages means for operating said clutch means.

10. A lens assembly as set forth in claim 7, wherein said leaf spring member and said projecting member have cooperable click stop means for releasably retaining the position of said leaf spring member relative to said projecting member.

11. A lens assembly having an optical system including a lens group shiftable along an optical axis to perform a focusing operation, comprising:
a focusing operation member rotatable around the optical axis to shift said lens group to perform the focusing operation;
means for power-driving said focusing operation member;
a handling member adapted to be rotated manually with respect to said focusing operation member about the optical axis to perform the focusing operation;
a connecting member having one end fixed to said handling member, and the other end shiftable in a radial direction with respect to the optical axis between said focusing operation member and said handling member;
changing-over means having a manual mode position where said the other end of said connecting member is shifted toward said focusing operation member and an automatic mode position where said the other end is shifted toward said handling member;
recess means provided in said focusing operation member for receiving said the other end of said connecting member shifted toward said focusing operation member by means of said changing-over means; and
guiding means having a pair of guiding walls formed on said handling member so as to hold said the other end of the connecting member therebetween and adapted for regulating the shifting movement of said the other end of the connecting member between said focusing operation member and said handling member only in said radial direction.

12. A lens assembly having an optical system including a lens group shifting along an optical axis to perform a focusing operation, comprising:
a focusing operation member rotatably around the optical axis to shift said lens group along the optical axis to perform the focusing operation;
power drive means for power driving sad focusing operation member;
a focusing handling member rotatable around said focusing operation member to perform the focusing operation manually;
connecting means provided between said focusing operation member and said focusing handling member for transmitting the rotation of said focusing handling member to said focusing operation member, said connecting means including a plurality of engaging recesses formed at predetermined intervals in a circumferential direction about said optical axis and a connecting member shiftable to engage with one of said recesses; and
changing over means for changing over between a manual focusing mode position where said connecting member is engaged by one of said recesses and an automatic focusing mode position where said connecting member is disengaged from said recess, said changing over means being supported by said focusing handling member so as to be slidable in a direction parallel to said optical axis relative to said focusing handling member, and including an operation member that extends through said focusing handling member to shift said connecting member relative to one of said recesses.

13. A lens assembly as set forth in claim 12, wherein said engaging recesses are formed in an outer periphery of said focusing operation member.

14. A lens assembly having an optical system including a lens group shifting along an optical axis to perform a focusing operation, comprising:
a focusing operation member rotatable around the optical axis to shift said lens group along the optical axis to perform the focusing operation;
power drive mans for power driving said focusing operation member;
a focusing handling member rotatable around said focusing operation member to perform the focusing operation manually;
connecting means provided between said focusing operation member and said focusing handling member for transmitting the rotation of said focusing handling member to said focusing operation member, said connecting means including at least one engaging recess and a connecting member biased toward said recess, said recess and said connecting member being opposed to each other at a predetermined rotational position of said focusing handling member; and
changing over means for changing over between a manual focusing mode position where engagement of said recess and said connecting member is allowed and an automatic focusing mode position where engagement of said recess and said connecting member is inhibited, said changing over means being supported by said focusing handling member so as to be slidable in a direction parallel to said optical axis relative to said focusing handling member, and including an operation member that extends through said focusing handling member to shift said connecting member relative to said recess.

* * * * *

UNITED STATES PATENT AND TRADEMARK OFFICE
CERTIFICATE OF CORRECTION

PATENT NO. : 5,041,855
DATED : August 20, 1991
INVENTOR(S) : Kazumitsu TAKEZAWA et al It is certified that error appears in the above-identified patent and that said Letters Patent is hereby corrected as shown below:

On the cover sheet, please insert the following:

--[73]  Assignee:  Nikon Corporation, Tokyo, Japan--

Signed and Sealed this

Twenty-second Day of December, 1992

*Attest:*

DOUGLAS B. COMER

*Attesting Officer*        *Acting Commissioner of Patents and Trademarks*